Aug 5, 1941.    Y. NEAL    2,251,632
RECORDING DEVICE
Filed June 22, 1938    2 Sheets-Sheet 1

INVENTOR
Younger Neal
BY Edward H. Lang
ATTORNEY

Aug 5, 1941.   Y. NEAL   2,251,632
RECORDING DEVICE
Filed June 22, 1938   2 Sheets-Sheet 2

INVENTOR
Younger Neal
BY Edward H. Sang
ATTORNEY

Patented Aug. 5, 1941

2,251,632

UNITED STATES PATENT OFFICE 2,251,632

RECORDING DEVICE

Younger Neal, Chicago, Ill., assignor to The Pure Oil Company, Chicago, Ill., a corporation of Ohio Application June 22, 1938, Serial No. 215,286

7 Claims. (Cl. 234—66)

This invention relates to line tension and/or weight recording devices and more particularly to a device for determining line tension and/or weight in rotary drilling and other earth boring operations.

In the rotary drilling of oil wells it is necessary for efficient operation to have the weight with which the drilling bit rests on the bottom of the hole, carefully adjusted. Instruments are now in use for assisting the driller in determining the weight of the bit on the bottom of the hole, such as that disclosed in the patent to Martin 1,771,340. Such devices, however, are not capable of accurately indicating or recording small changes in pipe tension and therefore when it is desired to rest the bit lightly on the bottom of the hole, it is not possible with such devices to determine when the desired weight is attained. For example, with a drilling string weighing 50,000 pounds it may be desirable to rest the bit on the bottom of the hole with a weight equivalent to only a few thousand pounds. The devices of the prior art are incapable of accurately determining weights of this magnitude.

The object of my invention is to provide a device which records decreases in pipe tension and therefore the weight of the bit on the bottom of the hole of both large and small magnitudes. This is accomplished by supplying a recording gauge having a vernier capable of moving through a distance which may be any desired multiple of the distance moved by the main recording hand. Thus, by multiplying the distance moved by the vernier hand, small differences in pipe tension and hence small changes in the weight of the bit on the bottom of the hole may be recorded and read while at the same time large changes may also be recorded and read.

To more fully understand my invention, reference should be had to the accompanying drawings, of which—

Figure 2:
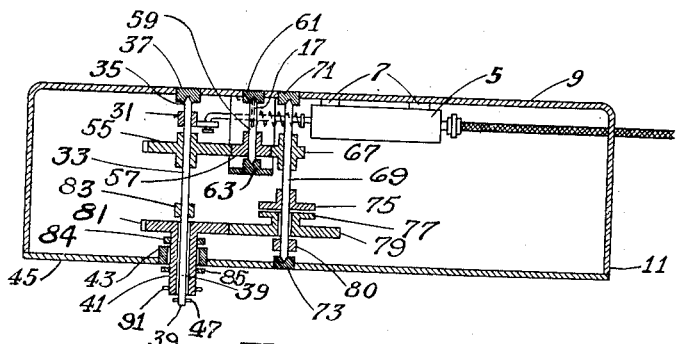
Fig. 2 is a horizontal cross section looking downwardly along the line 2—2 of Fig. 1.
Figure 1:
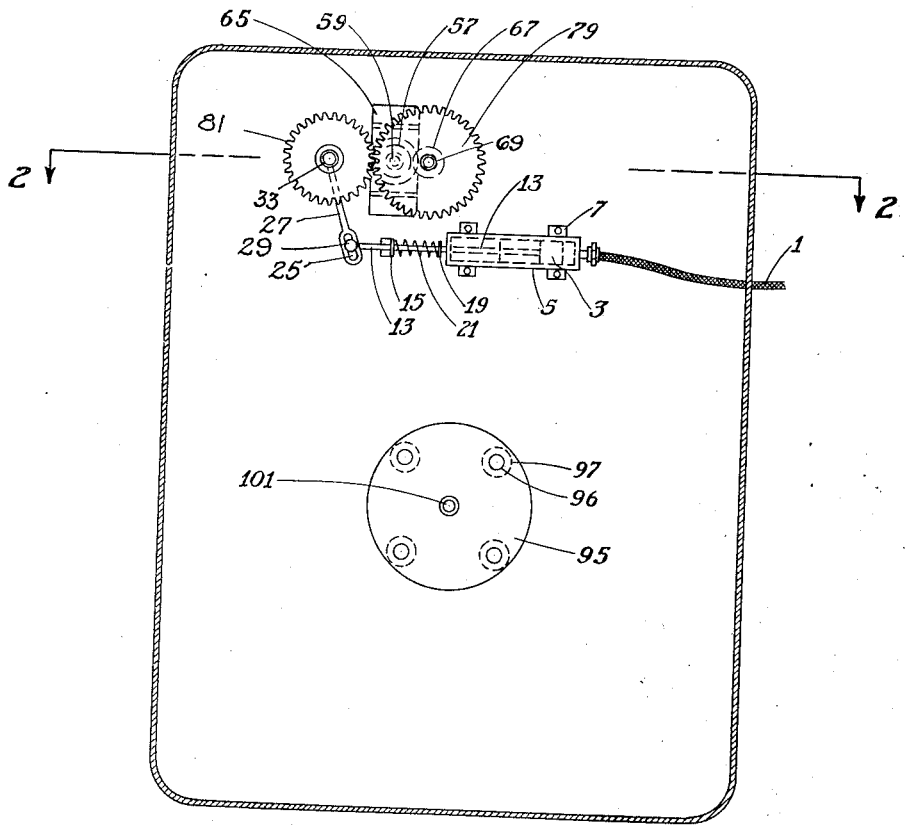
Fig. 1 is a front elevational view of a device in accordance with my invention, with the front portion of the casing cut away.
Figure 3:
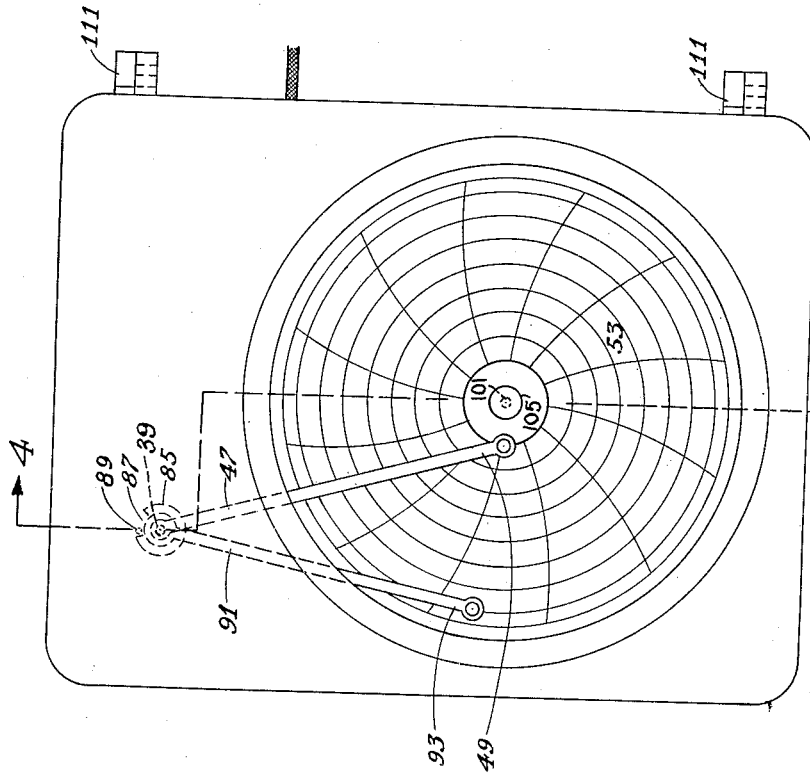
Fig. 3 is a front elevational view of the device.
Figure 4:
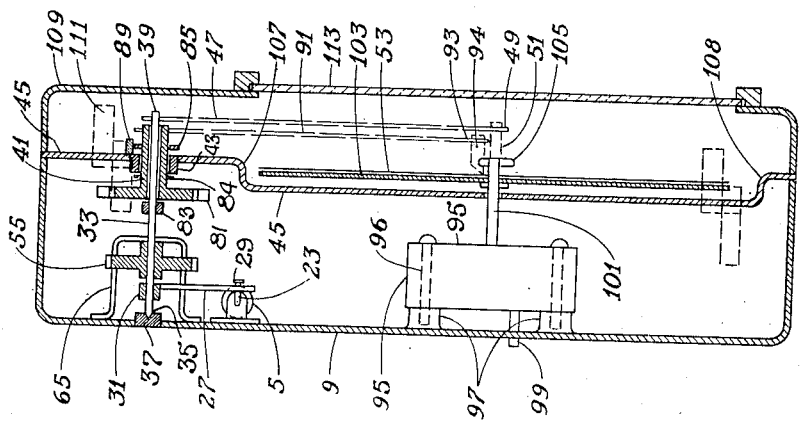
Fig. 4 is a vertical sectional view looking along the line 4—4 of Fig. 3.

Referring more particularly to the drawings, the numeral 1 indicates a flexible line connected to a diaphragm device or cylinder such as that shown in the Martin Patent 1,771,340. As indicated in the patent, the device is filled with oil or other liquid and the line 1 is adapted to be connected to the reservoir filled with fluid. Changes in pipe tension of the drilling or other string are transmitted through the oil or other fluid in line 1 and in the reservoir to which line 1 is adapted to be connected, to a piston 3 slidably mounted in a cylinder 5. The cylinder 5 is fastened by suitable brackets 7 to the back wall 9 of the rectangular metal casing 11. A rod 13 is fastened to the piston 3 and extends outside of the rear end of the cylinder. The portion of the rod 13 extending outside the cylinder is adapted to slide in a stationary collar 15. The collar 15 is rigidly mounted by means of the arm 17 on the back wall 9 of the casing. A spring follower 19 is also mounted on the piston rod 13 and a calibrated coil spring 21 is mounted on the rod between the collar 15 and the follower 19. The outer end 23 of the rod 13 is bent at right angles and passes through a slot 25 on the end of a connecting rod 27. The end of the rod is provided with an enlarged head 29 to prevent the rod from slipping out of the slot.

The length of the stroke of the piston rod 13 is fixed by the length of the cylinder 5 at such an amount as to limit the travel of a recording arm (to be later described) in order to prevent it from being forced against the sides of the casing and being bent or broken.

The end 31 of the connecting rod 27 is rigidly mounted on shaft 33 by means of a key or otherwise. The shaft is mounted horizontally in the upper part of the casing with the end 35 rotatably mounted in the bearing 37 supported on the rear wall of the casing and the forward end 39 of the shaft being rotatably mounted in the sleeve 41 which in turn is rotatably supported in the bearing 43 fastened to the front face 45 of the casing. The forward end 39 of the shaft 33 extends beyond the casing and the sleeve 41 and has rigidly mounted thereon an arm 47. The end 49 of the arm 47 is provided with a pen 51 which is adapted to contact the chart 53 and draw a line thereon when the chart and/or pen move relative to each other.

A gear wheel 55 is rigidly mounted on the shaft 33 and is adapted to mesh with a gear wheel 57 of smaller diameter mounted on the shaft 59, preferably mounted in the same horizontal plane as shaft 33. The rear end of the shaft 59 is rotatably supported by the bearing 61 fastened to the rear wall of the casing, and the forward end of the shaft 59 is mounted in the bearing 63 which is in turn supported by the bracket 65 fastened to the rear wall 9 of the casing. The bearing 63 may be formed as an integral part of the bracket 65. The gear wheel 57 in turn is adapted to mesh with a smaller gear 67 which is in turn rigidly mounted on shaft 69, preferably mounted in the same horizontal plane as shafts 33 and 59. The shaft 69 is rotatably mounted at its rear end in the bearing 71 supported by the rear wall 9 of the casing, and the forward end of the shaft 69 is rotatably mounted in the bearing 73 which is supported on the front face 45 of the casing.

A clutch 75 is rigidly mounted on the shaft 69 and is adapted to lightly engage the plate 77, which is formed integrally with the gear 79, and cause the plate and gear to rotate. The gear 79 and plate are rotatably mounted on the shaft 69. A collar 80 is rigidly mounted on the shaft 69 on the side of the gear 79 opposite to that of the clutch in order to prevent lateral movement of the gear and plate 77. The gear wheel 79 is of larger diameter than the gear wheel 55.

The gear wheel 79 is adapted to mesh with gear wheel 81 which is preferably formed integrally with the sleeve 41 and rotatably mounted on the shaft 33. The gear wheel 81 is of smaller diameter than the gear wheel 79 and, as shown, has substantially the same diameter as gear 55. A collar 83 is rigidly mounted on the shaft 33 to prevent lateral movement of the gear wheel 81 in one direction. The sleeve 41 is formed with a flange 84 which abuts against bearing 43 and prevents lateral motion of gear 81 in the other direction. The outer end of the sleeve 41 extends beyond the front face 45 of the casing and has rigidly mounted thereon a disc 85 having therein a peripheral notch 87. A horizontal pin 89 fastened to the front face 45 of the casing, extends into the notch 87. An arm 91 is rigidly mounted on the outer end of the sleeve 41 and the end 93 of the arm has fixed thereto a pen 94 adapted to contact the chart 53.

A clock mechanism 95 is mounted on the rear wall 9 of the casing slightly below the center thereof. The clock is fastened to the rear wall by means of the long screws 96 which are adapted to screw into the threaded bosses 97 formed integrally with the wall 9 of the casing. The rod 99 is provided for winding the clock. The shaft 101 extends centrally from the clock mechanism and is adapted to be rotated thereby. The outer end of the shaft 101 extends beyond the front face 45 of the casing and has rigidly fixed thereto a large disc 103. The charts 53 are adapted to fit on the outer end of the shaft 101 and to be supported by the disc 103. The chart is adapted to be held in place by the circular headed nut 105 which screws onto the end of the shaft 101.

The front face 45 of the casing is preferably crimped outwardly at 107 and 108 in order to provide sufficient room and support for the gear mechanism in the upper portion of the casing. A cover 109 is hinged to the casing by means of hinges 111 and has a circular glass or other visible central portion 113 of sufficient area to enable the entire chart to be seen. The cover is adapted to be swung open on its hinges to remove and insert the charts and to supply the pens with ink when necessary.

In operation the device works as follows:

Assuming that the bit is hanging free in the hole, the full tension of the drilling string will be exerted on the fluid in the line 1 which will in turn impart maximum pressure to the piston 3, causing the arm 27 to rotate the gear 55 and shaft 33 in a clockwise direction. The end 49 of the arm 47 will be swung outwardly so that the pen 51 will be resting adjacent the outer circumference of the chart. It will be understood that for large changes in weight of drilling string, the coil spring 21 on the piston rod may be adjusted or a spring of different tension supplied in order that the force of the spring opposing the movement of the piston 3 will, when partially compressed, equal the hydraulic pressure applied to the piston through line 1 when maximum hydraulic pressure is imposed. This equilibrium should be obtained when the follower 19 has travelled away from cylinder 5 a sufficient distance to bring pen 51, actuated through rod 13, connecting rod 27, shaft 33 and arm 49, at rest at the outer circle of chart 53. At the same time as the arm 47 swings outwardly, the gear mechanism will cause the arm 91 to swing in a counterclockwise direction and the pen 94 attached thereto will be caused to come to rest adjacent the periphery of the smallest circle of the chart. The arc through which the arm 91 can swing is fixed by the slot 87 and the stop pin 89. The clutch mechanism engages very lightly so that the stop pin 89, coacting with the slot 87, is capable of arresting the movement of the arm 91 although the clutch is always in engagement.

When the drilling bit reaches the bottom of the hole and a part of the tension on the drill pipe is released by virtue of the fact that the bit and a portion of the weight of the pipe rest on the bottom of the hole, the arm 47 will then swing inwardly to an extent proportionate with the release of tension. The arm 91 will at the same time be caused to swing outwardly a distance directly proportional to the multiplication imparted to the arm by the gear mechanism. The multiplication applied to the vernier will be determined by the particular operation and may be changed by changing the relative size of the coacting gears. A desirable ratio is five or six to one. Therefore the arm 91 will trace an arc five or six times as long as that traced by the arm 49 for a given decrease in line tension. Thus, if the bit and portion of weight of pipe are caused to rest very lightly on the bottom of the hole, the weight of the portion of pipe weight and bit on the bottom of the hole will be indicated accurately by the vernier pen 94. However, if the bit is then supported heavily on the bottom of the hole, the arm 91 will swing outwardly and come to rest at the outer circle of the chart by virtue of the coaction of the slot 87 and stop pin 89 and will not record a further decrease in tension in the drilling string until after there has first been an increase in tension. The pen 51 in such cases records the weight of the bit on the bottom of the hole. In other words, only when the change in weight of the drilling string is within the recording range of the vernier arm will this arm record. In those cases when the decrease in line tension is large, this arm is inactive and the arm 47 with its pen 51 is capable of recording the weight of the bit on the bottom of the hole and the stress on the drilling string.

As an example, suppose the weight of the drilling string is 50,000 pounds and the recorder is adjusted so that the arm 47 with pen 51 rests on the outer circumference of the recording chart, and when the entire tension on the line was relieved by resting the bit on the bottom of the hole, the pen 51 rested at the inner circumference of the chart. Let it further be assumed that the movement of the arm 91 is multiplied over that of arm 47 by five. Then the pen 94 could record weights up to 10,000 pounds and decrease in line tension up to 10,000 pounds. It will be seen that if the decrease in line tension and therefore the weight of the bit on the bottom of the hole is of a magnitude of only several hundred pounds, the movement of the arm 47 would be imperceptible and in such cases the vernier arm 91 must be read in order to get the weight of the bit and the decrease of the line tension.

The speed at which the clock mechanism is adapted to rotate the chart may be varied at will, ranging anywhere from one rotation per hour or less to one rotation in eight days or more.

Although I have shown and described a specific mechanism for carrying out my invention, it is to be understood that the invention is not limited to the specific construction shown and described but that the invention is intended to broadly embrace all weight recording mechanisms which utilize a vernier to record weights and line tensions of small magnitudes and thereby give an accurate recordation of the weights of the drilling bit or other apparatus and the tension in the string during the entire drilling or other operation. Other means for effecting the multiplying movement of the vernier and other types of record mechanisms may be substituted for those illustrated and described without departing from the broad invention.

What I claim is:

1. A recording device comprising a casing, a shaft rotatably mounted in said casing, a gear rigidly mounted on said shaft, a second gear rotatably mounted on said shaft, a second shaft rotatably mounted in said casing, a gear rigidly mounted on said second shaft in operative engagement with and of smaller diameter than said first mentioned gear, a clutch mounted on said second shaft, a second gear and a clutch plate rotatably mounted on said second shaft, said clutch plate being in operative engagement with said clutch and being integral with said second gear, said second gear on said second shaft being in operative engagement with and being of greater diameter than said second gear on said first mentioned shaft, separate recording means operable by said first mentioned shaft and by said second gear on said first mentioned shaft, and means for operably connecting said first mentioned shaft to an actuating means.

2. Device in accordance with claim 1 in which the clutch lightly engages the clutch plate and including means for arresting the motion of the recording means operable by said second gear at fixed points while said clutch is in engagement.

3. Device in accordance with claim 1 in which the clutch lightly engages the clutch plate and including means for arresting at fixed points the motion of the recording means operable by said second gear, said means comprising a stationary projection adapted to co-act with a slotted disc rigidly attached to said second recording arm.

4. A recording device comprising a rotatable shaft, a gear rigidly mounted on said shaft, a second gear rotatably mounted on said shaft, a second rotatable shaft, a gear rigidly mounted on said second shaft in operative engagement with said first mentioned gear, a clutch mounted on said second shaft, a second gear and a clutch plate rotatably mounted on said second shaft, said clutch plate being in frictional engagement with said clutch and being adapted to rotate integrally with said second gear, said second gear on said second shaft being in operative engagement with said second gear on said first mentioned shaft, separate recording means operable by said first mentioned shaft and by said second gear on said first mentioned shaft, means for arresting the motion at fixed points of the second recording means operable by said second gear, said arresting means comprising a stationary projection adapted to co-act with a slotted disc rigidly attached to said second recording means, and means for operably connecting said first mentioned shaft to an actuating means.

5. A device of the character described comprising means for translating fluid pressure into mechanical movement, means for indicating the magnitude of said mechanical movement, means for multiplying said mechanical movement including a slip clutch, separate means for indicating said multiplied movement and means for arresting the motion of said separate indicating means at fixed points.

6. A device of the character described comprising a casing, a shaft rotatably mounted in said casing, a gear rigidly mounted on said shaft, a second rotatable shaft, a gear rigidly mounted on said second shaft, in operative engagement with and of smaller diameter than said first mentioned gear, a third rotatable shaft, a gear rigidly mounted on said third shaft in operative engagement with and of smaller diameter than said gear on said second shaft, a clutch rigidly mounted on said third shaft, a second gear and a clutch plate rotatably mounted on said third shaft, said clutch plate being in operative engagement with said clutch and being integral with said second gear, a second gear rotatably mounted on said first mentioned shaft in operative engagement with and of smaller diameter than the second gear on said third shaft, recording means operated by said first mentioned shaft, separate recording means operated by said second gear on said first mentioned shaft and means for actuating said first mentioned shaft.

7. Device in accordance with claim 6 in which the clutch lightly engages the clutch plate and including means for arresting the motion of said second recording means at fixed points while said clutch is in engagement.

YOUNGER NEAL.